(12) United States Patent
Adam et al.

(10) Patent No.: US 7,496,667 B2
(45) Date of Patent: Feb. 24, 2009

(54) DECENTRALIZED APPLICATION PLACEMENT FOR WEB APPLICATION MIDDLEWARE

(75) Inventors: Constantin M. Adam, New York, NY (US); Giovanni Pacifici, New York, NY (US); Michael J. Spreitzer, Croton On Hudson, NY (US); Malgorzata Steinder, Leonia, NJ (US); Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/344,606

(22) Filed: Jan. 31, 2006

(65) Prior Publication Data

US 2007/0180083 A1    Aug. 2, 2007

(51) Int. Cl.
*G06F 15/173* (2006.01)
*G06F 9/46* (2006.01)

(52) U.S. Cl. .................. 709/226; 709/223; 709/225; 718/104

(58) Field of Classification Search ............... 709/226
See application file for complete search history.

(56) References Cited

U.S. PATENT DOCUMENTS

| | | | | |
|---|---|---|---|---|
| 6,976,090 B2 * | 12/2005 | Ben-Shaul et al. | ........... | 709/246 |
| 7,263,560 B2 * | 8/2007 | Abdelaziz et al. | ........... | 709/238 |
| 2002/0166117 A1 | 11/2002 | Abrams et al. | ............. | 717/177 |
| 2003/0110242 A1 | 6/2003 | Brown et al. | ............. | 709/222 |
| 2004/0267897 A1 * | 12/2004 | Hill et al. | ................. | 709/217 |
| 2005/0027843 A1 | 2/2005 | Bozak et al. | .............. | 709/223 |
| 2005/0131954 A1 * | 6/2005 | Heller et al. | .............. | 707/200 |
| 2005/0188075 A1 * | 8/2005 | Dias et al. | ................. | 709/224 |
| 2006/0095917 A1 * | 5/2006 | Black-Ziegelbein et al. | . | 718/104 |
| 2006/0242647 A1 * | 10/2006 | Kimbrel et al. | ............ | 718/104 |
| 2007/0280279 A1 * | 12/2007 | Mituhasi et al. | ............ | 370/428 |

OTHER PUBLICATIONS

Bhattacharya et al., "Energy conservation in Wireless Sensor Networks," Univ. of Virginia, Dept. of Computer Science, http://www.cs.virginia.edu/posters/sagnik.ppt.

Akkerman et al., "Infrastructure for Automatic Dynamic Deployment of J2EE Applications in Distributed Environments," CIMS Technical Report TR2005-867, Dept. of Computer Science, Courant Institute of Mathematical Sciences, 2005, www.cs.nyu.edu/~totok/professional/papers/TR2005-867.pdf.

Li et al., "A Decentralized Agent Framework for Dynamic Composition and Coordination for Autonomic Applications," Proc. Of the 16th Int'l. Workshop on Database and Expert System Applications (DEXA 2005), 3rd Int'l. Workshop on Self-Adaptive and Autonomic Computing Systems (SAACS 05), Copenhagen, Denmark, IEEE Computer Society Press, pp. 165-169, Aug. 2005, http://www.caip.rutgers.edu/TASSL/Papers/rudder-saacs-05.pdf.

(Continued)

*Primary Examiner*—Joseph E Avellino
*Assistant Examiner*—Gerald Smarth
(74) *Attorney, Agent, or Firm*—Ido Tuchman; Lisa M. Yamonaco

(57) ABSTRACT

A decentralized process to ensure the dynamic placement of applications on servers under two types of simultaneous resource requirements, those that are dependent on the loads placed on the applications and those that are independent. The demand (load) for applications changes over time and the goal is to satisfy all the demand while changing the solution (assignment of applications to servers) as little as possible.

1 Claim, 12 Drawing Sheets

OTHER PUBLICATIONS

Stewart et al., "Profile-Driven Component Placement for Cluster-Based Online Services," http://www.cs.rochester.edu/~kshen/papers/mw2004.pdf.

Adam, "Scalable Self-Organizing Server Clusters with Quality of Service Objectives," Thesis, TRITA-S3-LCN-0509, Laboratory for Communication Networks, School of Electrical Engineering, KTH Royal Institute of Technology, Stockholm, Sweden, 2005, http://www.diva-portal.org/diva/getDocument?urn_nbn_se_kth_diva-272-1_fulltext.pdf.

Stewart et al., "Performance Modeling and System Management for Multi-Component Online Services," 2005, www.cs.rochester.edu/~kshen/papers/nsdi2005.ps.

* cited by examiner

|  | Node 1 | Node 2 | ... | Node n |
|---|---|---|---|---|
| Application 1 | 1 | 0 | ... | 1 |
| Application 2 | 1 | 1 | ... | 0 |
| Application 3 | 0 | 0 | ... | 1 |
| Application m | 0 | 0 | ... | 1 |

DECENTRALIZED APPLICATION PLACEMENT FOR WEB APPLICATION MIDDLEWARE

FIELD OF THE INVENTION

The present invention is directed to application placement on a cluster of computers, and more specifically, to decentralized, on-demand application resource allocation in a distributed manner as the load for applications fluctuates.

BACKGROUND

With the proliferation of the World Wide Web (WWW or simply the "Web") and outsourcing of data services, computing service centers have increased in both size and complexity. For example, service center may include a collection of servers referred to as a server farm that run processes for a specific application, known as a cluster. Such centers provide a variety of services, such as Web content hosting, e-commerce, Web applications, and business applications. Managing such centers is challenging since a service provider must manage the quality of service provided to competing applications in the face of unpredictable load intensity and distribution among the various offered services and applications. Several management software packages which deal with these operational management issues have been introduced. These software systems provide functions including monitoring, demand estimation, load balancing, dynamic provisioning, service differentiation, optimized resource allocation, and dynamic application placement. The last function, namely dynamic application placement, is the subject of this invention.

Service requests are typically satisfied through the execution of one or more instances of each of a set of applications. Applications include access to static and dynamic Web content, enterprise applications, and access to database servers. Applications may be provided by HTTP (Hypertext Transfer Protocol) Web servers, servlets, Enterprise Java Beans (EJB), or database queries. When the number of service requests for a particular application increases, the management software in charge of placing applications deploys additional instances of the application in order to accommodate the increased load. It is often important to have an on-demand management environment allowing instances of applications to be dynamically deployed and removed. The problem is to dynamically change the number of application instances so as to satisfy the dynamic load while minimizing the overhead of starting and stopping application instances.

One problem associated with automatic instantiation of application processes in a server farm as the load for the applications fluctuates is that each server machine can run some limited number of application processes. Request messages for a particular application are split among all instances of that application. Therefore, when application instances use different servers, the size of a cluster directly impacts the amount of load that the cluster can sustain without performance degradation.

When the size of a cluster is insufficient, the application users experience performance degradation or failures, resulting in the violation of Service Level Agreements (SLA). Currently, to avoid SLA violation, application providers generally overprovision the number of application instances to handle peak load. This results in poor resource utilization during normal operation conditions. Dynamic allocation alleviates the problem of wasted capacity by automatically real-locating servers among applications based on their current load and SLA objectives.

Most of the placement algorithms available today are centralized. A centralized approach generally does not have the capability to react immediately to changes that occur between two placement operations. In a centralized solution, a single controller often needs to handle constraints from several nodes. Moreover, each application typically requires a certain time to start or stop. During this time, the reconfiguration process can take most of the CPU power on the local machine and therefore can partially disrupt its service capability. A centralized solution typically needs an enhancement to schedule the changes in such a way that they do not happen at the same time, in order to avoid a drastic reduction in the overall processing power of the system.

SUMMARY OF THE INVENTION

The present invention addresses the problem of automatic instantiation of application processes in a server farm to allow the server farm to dynamically adjust the number of application processes as the load for the applications fluctuates. A decentralized solution of application placement can have a number of conceptual advantages, compared to a centralized solution. First, decentralized placement enables the system to continuously reconfigure in face of external events, as the algorithm runs independently and asynchronously on each machine in the system. Second, the complexity of the decentralized solution is lower, as each node manages only local resources. Third, there is no configuration overhead in the decentralized case, as each machine has identical functionality, as opposed to the centralized solution, where the placement algorithm runs on a single machine. The present invention beneficially optimizes dynamic placement of computing applications on servers to satisfy the entire application demand while changing the assignment of applications as little as possible.

One exemplary aspect of the invention is a method for decentralized application resource allocation for a cluster of nodes. The method includes a receiving operation configured to receive, at a local node, resource utilization data of applications from a subset of nodes in the node cluster. The local node includes a current set of applications it is executing. A determining operation forms a new set of applications to execute at the local node. The new set of applications optimizes an objective function as computed locally by the local node and is based, at least in part, on the utilization data. A modifying operation modifies which applications are executed at the local node according to the new set of executing applications. A sending operation advertises from the local node to the subset of nodes in the node cluster application execution changes between the new set of applications and the current set of applications at the local node.

Another exemplary aspect of the invention is a system for decentralized application resource allocation for a cluster of nodes. The system includes a processor configured to execute a computer program and a network interface coupled to the processor and configured to send and receive data over the computer network. Furthermore, a storage device embodies the computer program. The computer program includes computer executable instructions configured for receiving, at a local node, resource utilization data of applications from a subset of nodes in the node cluster; determining a new set of applications to execute at the local node which optimizes an objective function as computed locally by the local node based, at least in part, on the utilization data; modifying which applications are executed at the local node according to the new set of executing applications; and sending from the local node to the subset of nodes in the node cluster application execution changes between the new set of applications and the current set of applications at the local node.

Yet a further exemplary aspect of the invention is a computer program product embodied in a tangible media. The computer program product includes computer readable program codes configured to cause the program to receive, at a local node, resource utilization data of applications from a subset of nodes in the node cluster; determine a new set of applications to execute at the local node which optimizes an objective function as computed locally by the local node based, at least in part, on the utilization data; modify which applications are executed at the local node according to the new set of executing applications; and send from the local node to the subset of nodes in the node cluster application execution changes between the new set of applications and the current set of applications at the local node.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
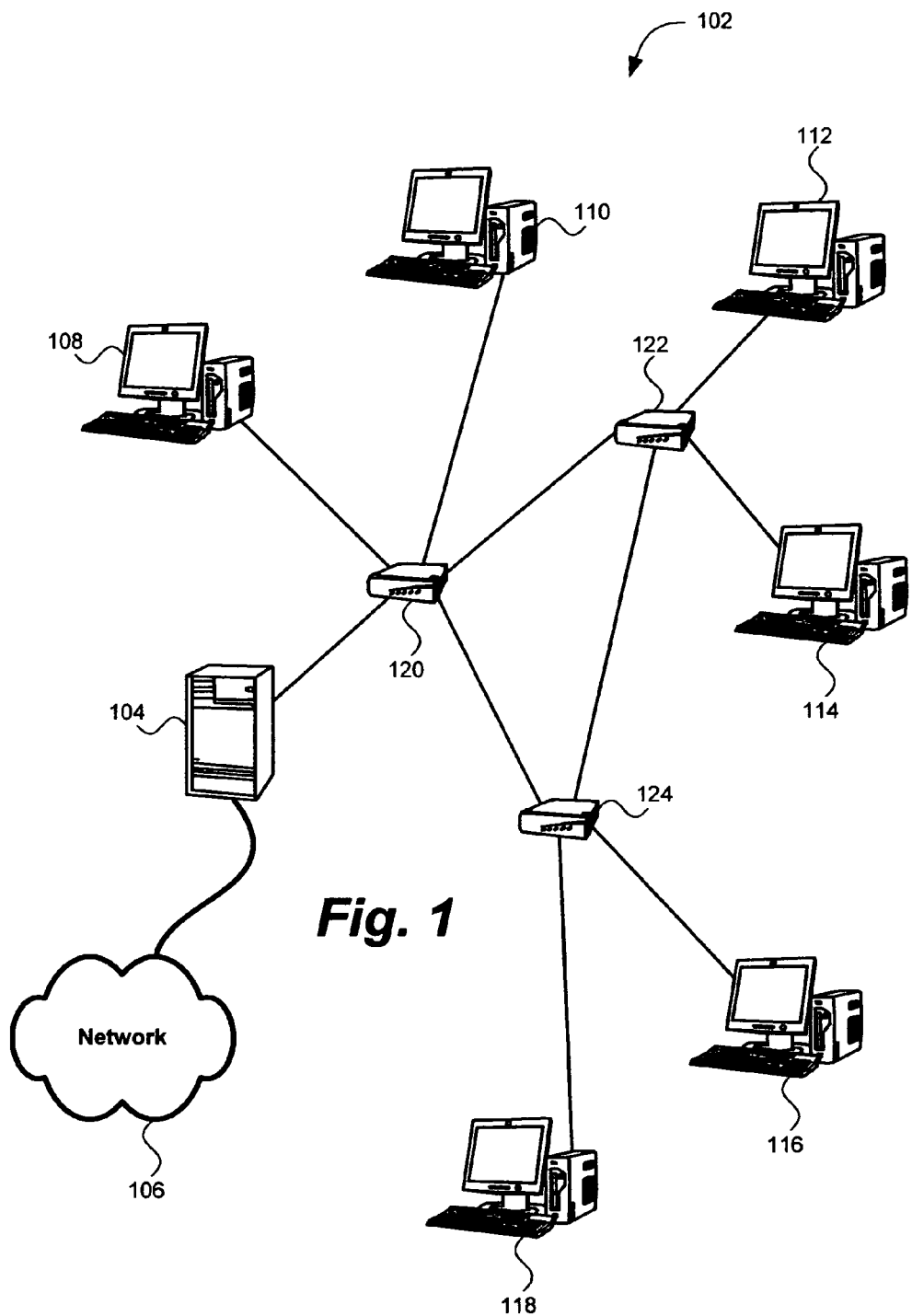
FIG. 1 shows a block diagram of the main components of an exemplary system and their physical inter-connection.

The following description details how the present invention is employed to optimized dynamic placement of computing applications on servers to satisfy the entire application demand. Throughout the description of the invention reference is made to FIGS. 1-11. When referring to the figures, like structures and elements shown throughout are indicated with like reference numerals.

Problem Formulation

The dynamic application placement problem is formulated as follows: We are given m servers $1, \ldots, m$ with memory capacities $\Gamma_1, \ldots, \Gamma_m$ and service capacities (number of requests that can be served per unit time) $\Omega_1, \ldots, \Omega_m$. We are also given n applications $1, \ldots, n$ with memory requirements $\gamma_1, \ldots, \gamma_n$. Application j must serve some number of requests $\omega_{jt}$ in time interval t.

A feasible solution for the problem at time t is an assignment of applications' workloads to servers. Each application can be assigned to (replicated on) multiple servers. For every server i that an application j is assigned to, the solution must specify the number $\omega_{itj}$ of requests this server processes for this application. $\Sigma_i \omega_{itj}$ must equal $\omega_{jt}$ for all applications j and time steps t. For every server the memory and processing constraints must be respected. The sum of memory requirements of applications assigned to a server cannot exceed its memory $\Gamma_i$ and $\Sigma_i \omega_{itj}$, i.e., the total number of requests served by this server during the time step t cannot exceed $\Omega_i$. Note that each assignment (copy) of an application to a server incurs the full memory costs, whereas the processing load is divided among the copies.

The objective is to find a solution at time step t which is not very different from the solution at time step t-1. More formally, with every feasible solution we associate a bipartite graph $(A, S, E_t)$ where A represents the set of that application j is assigned to (or has copy on) server i at time step t. The objective function is to minimize $|E_t \emptyset E_{t-1}|$, i.e., the cardinality of the symmetric difference of the two edge sets. This is the number of application instances that must be shut down or loaded at time t.

System Model

Figure 2:
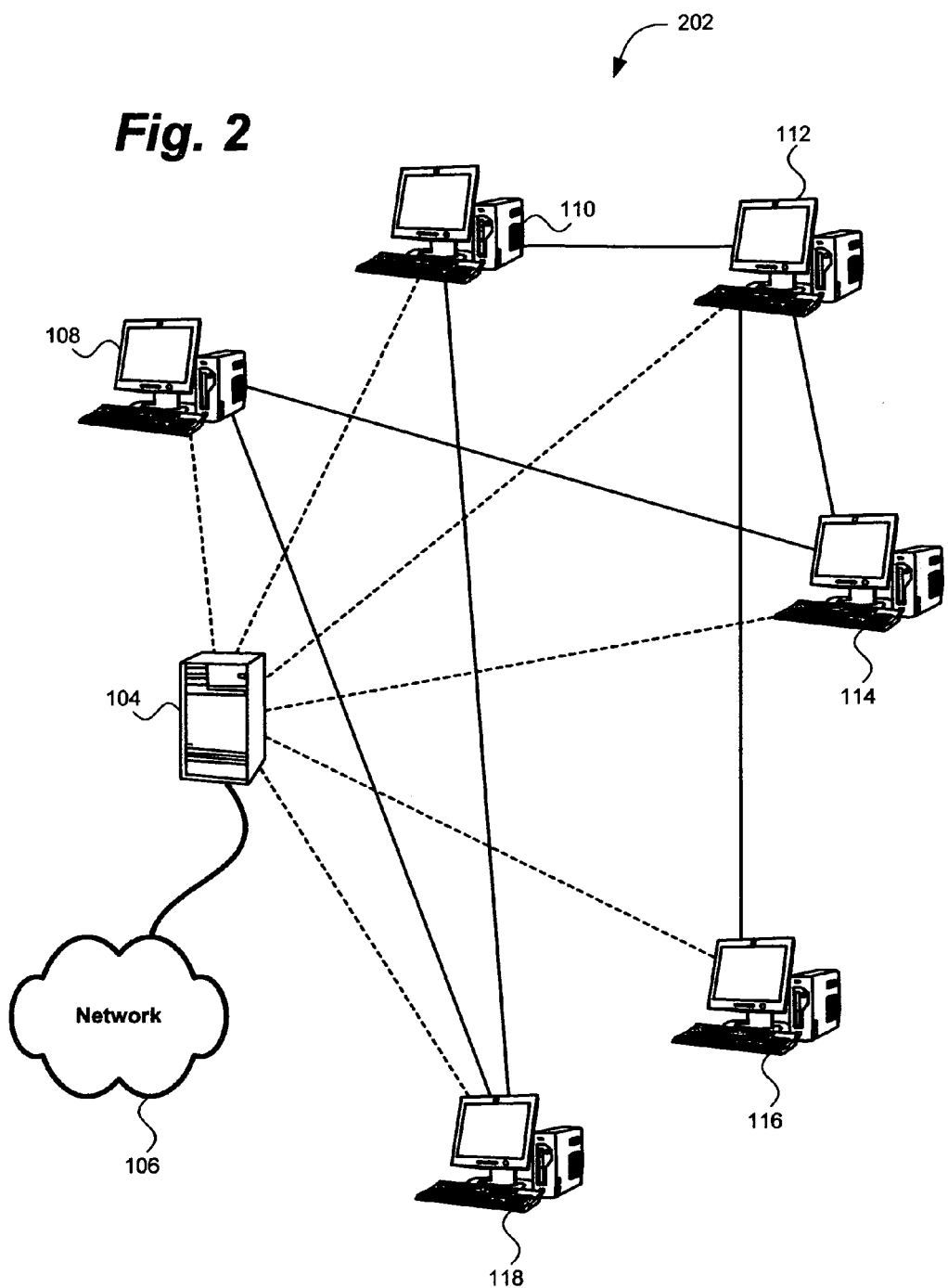
FIG. 2 shows a block diagram of the logical connections between the system components.
Figure 3:
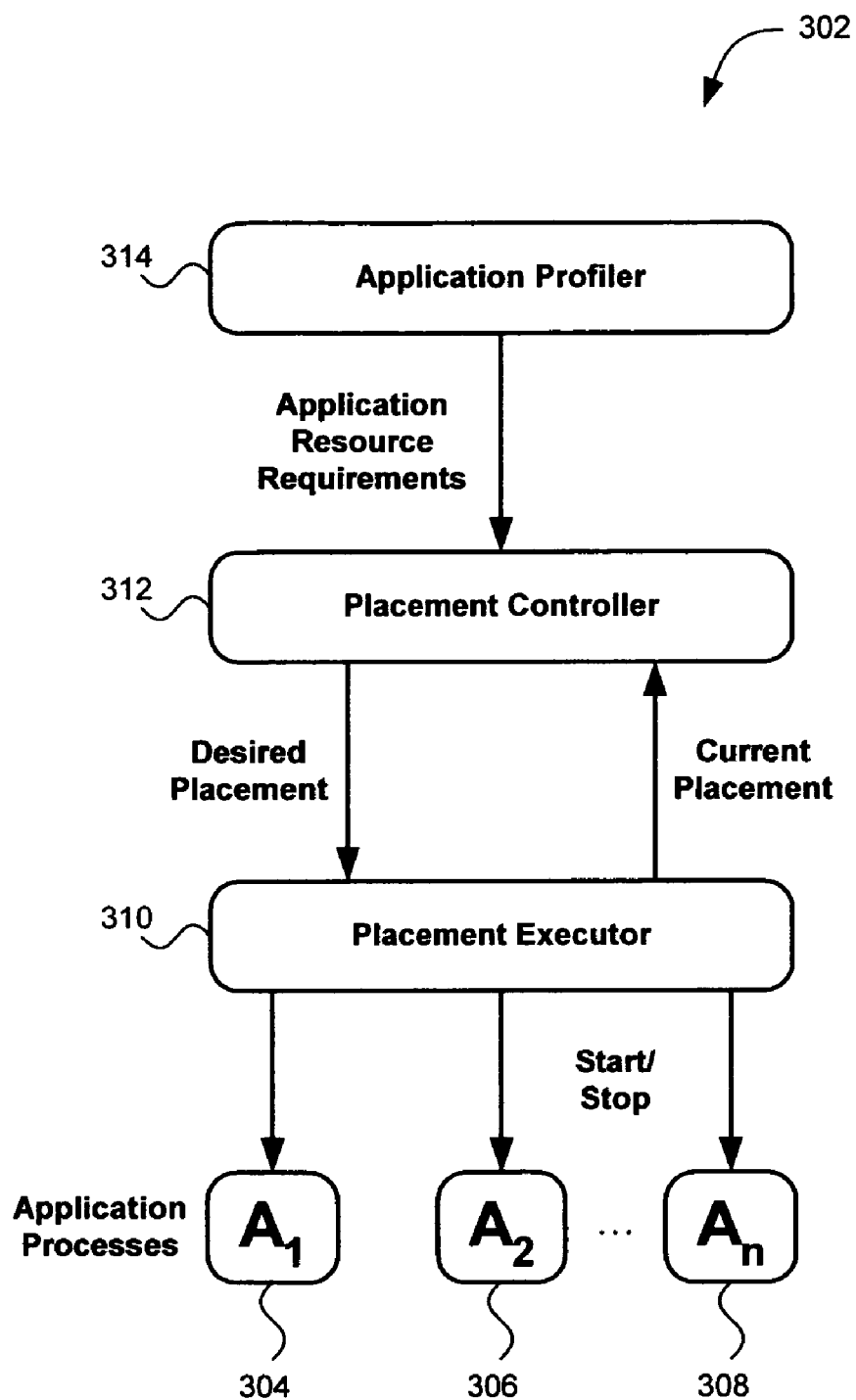
FIG. 3 is a block diagram that shows the software programs running on every node that is part of the exemplary system.

Once embodiment of the invention is implemented in a network system as generally illustrated in FIGS. 1, 2 and 3. FIG. 1 shows the physical infrastructure 102 of an exemplary system contemplated by the present invention. The physical infrastructure 102 comprises one or several entry points 104 coupled to a computer network 106. The computer network 106 may be a Local Area Network (LAN), a Wide Area Network (WAN), or a combination thereof. It is contemplated that the computer network 106 may be configured as a public network, such as the Internet, and/or a private network, such as an Intranet or other proprietary communication system. Various topologies and protocols known to those skilled in the art may be exploited by the network 106, such as TCP/IP and UDP. Furthermore, the computer network 106 may include various networking devices known in the art, such as routers, switches, bridges, repeaters, etc.

The physical infrastructure 102 additionally comprises several nodes 108-118. These components are inter-connected using networking devices, such as routers, switches, or hubs 120-124. The entry points 104 are switches that re-direct incoming requests to the nodes 108-118. Several types of hardware, such as computers, hardware layer 4-7 switches, or even mainframes can perform this functionality. The nodes 108-118 can be desktop computers, servers, laptops, or any other hardware device that includes a CPU, memory and that can be connected to a network.

FIG. 2 shows the logical topology 202 of the exemplary system, configured on top of the physical infra-structure shown in FIG. 1. The entry point 104 is connected via logical links to a large number of nodes (potentially all the nodes in the system). For illustration purposes, a logical link between an entry point a node is shown in FIG. 2 as a dashed line. The entry points forward the incoming requests to the nodes using various forwarding policies, such as round robin, or random forwarding. The nodes 108-118 self-organize in a logical overlay in which each node communicates solely with its neighbors. Thus, a subset of nodes in the node cluster is defined corresponding to the node's neighbors. Logical peer-to-peer links between nodes are shown as solid lines. The number of neighbors of a node is usually small compared to the total number of nodes in the system. Any overlay construction algorithm can be used to assign to a node a set of neighbors. The resulting overlay can be of various types, such as small-world and random graph. Logical links can be implemented in several ways. One possibility is to open a TCP connection between the nodes that are at the ends of a logical link. Another possibility is for each node to maintain a local list of neighbors, and limit communication to these neighbors.

In one embodiment, the nodes 108-118 maintain a set of relatively stable overlay neighbors and gather state information in each placement cycle. In another embodiment, the nodes 108-118 may not need to use a set of stable neighbors. Instead, the nodes 108-118 can run a gossip protocol to discover other nodes in the system and gather state information with different nodes in different placement cycles.

FIG. 3 shows exemplary software 302 executing on a single node. In one embodiment of the invention, all nodes have identical functionality in the context of the decentralized placement algorithm. A node can run one or several application processes 304-308. Each application process handles requests for a single type of application (the application types are denoted by $A_1, A_2 \ldots A_n$).

Each application can be characterized by two types of parameters: (1) load-independent requirements of resources required for running an application, and (2) load-dependent requirements which are a function of the external load or demand placed on the application. Examples of load-independent requirements are memory, communication channels, and storage. Examples of load-dependent requirements are current or projected request rate, CPU (Central Processing Unit) cycles, disk activity, and number of execution threads.

Similarly, a node (e.g., a server) can be characterized by two parameters: (1) a load-independent capacity which represents the amount of resources available to host applications on the node, and (2) a load-dependent capacity which represents the available capacity to process requests for the applications' services.

The placement executor 310, the placement controller 312 and the application profiler 314 are the software objects configured to provide the placement functionality. The placement executor 310 has the capability to stop or start application processes. The application profiler 314 gathers statistics for each local application, such as the request arrival rate, the total memory utilized by one application instance and the average number of CPU cycles consumed by an application request. In a particular embodiment of the invention, the application profiler 314 defining sets of load-dependent and sets of load-independent capacities of abstract sets of elements, discussed in more detail below.

The placement controller 312 contains the core logic of the decentralized placement algorithm. The placement controller 312 dynamically reconfigures placement of applications on each node based on an objective function to optimize a global placement of applications on all the nodes.

The placement controller 312 executes independently and asynchronously on each node. The time between two executions of the placement algorithm is referred to herein as an execution cycle. The placement algorithm is described in detail in below.

Figure 4:
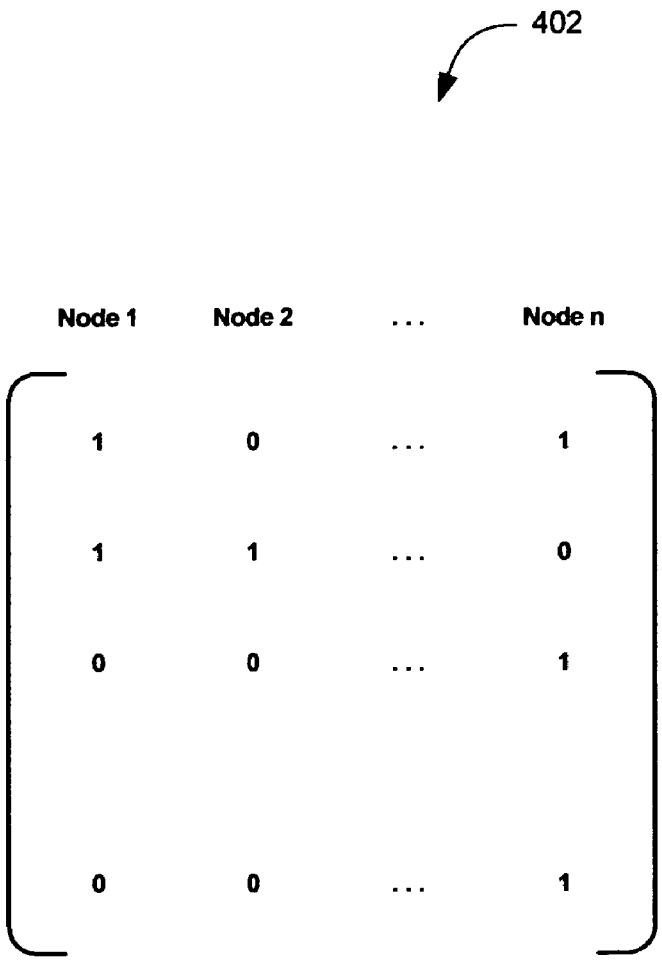
FIG. 4 is a block diagram showing an exemplary structure of a global placement matrix.

Each node maintains a replica of the global placement matrix P. The global placement matrix describes a plurality of nodes and a plurality of applications as abstract sets of elements. An exemplary structure of a global placement matrix 402 is shown in FIG. 4. Each row of the matrix corresponds to an application, and each column to a node. The elements of the matrix P are defined as follows: $P_{a,n}=1$ if application a runs on node n, $P_{a,n}=0$ otherwise. The process of updating and maintaining the global placement matrix is entirely decentralized.

Decentralized Placement Algorithm

The placement controller runs the placement algorithm in three phases. First, the placement controller gathers (partial) information about the current state of the system. Next, based on this information, the placement controller decides which applications should run on the local node during the incoming execution cycle. Finally, the placement controller disseminates in the system a set of updates for the global placement matrix that reflect the local decisions of the placement algorithm.

Gathering State Information

To ensure scalability, each node retrieves state information from a small set of neighbors. An overlay construction mechanism builds a logical topology that defines the neighbors for each node.

Figure 5:
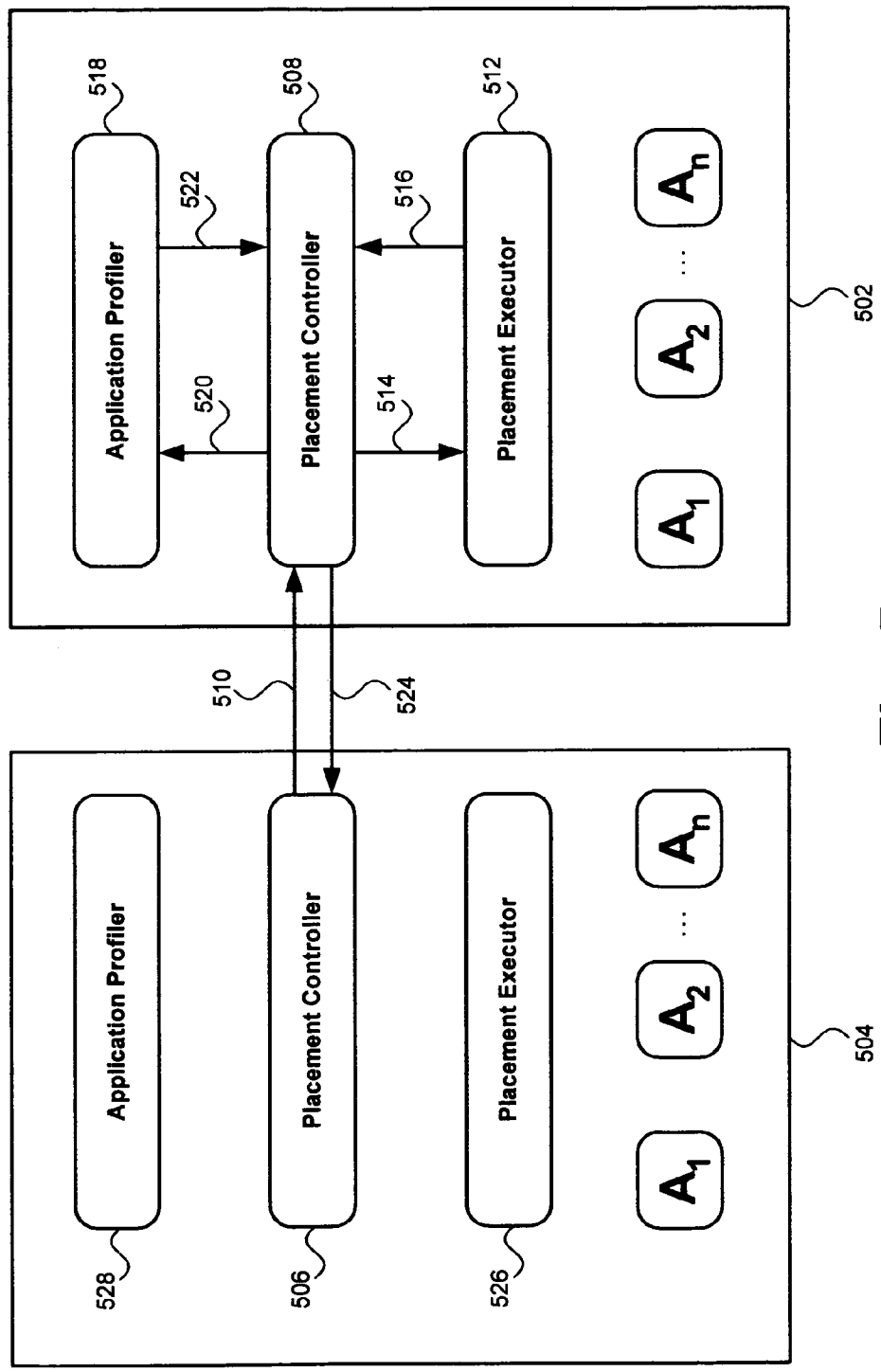
FIG. 5 shows a flow diagram illustrating an exemplary method in which a node retrieves state information from its neighbors.

FIG. 5 illustrates one way contemplated by the present invention in which state information is exchanged between neighbors. Assume that the nodes 502 and 504 are logical neighbors. The placement controller 506, running on the node 504, requests state information from the placement controller 508 running on the node 502, as represented by arrow 510. Upon receiving the requests, the placement controller 508 requests a list of active applications from the placement executor 512, as represented by arrow 514. In response, the placement executer 512 retrieves the list and sends it to the placement controller 508, as represented by arrow 516. The placement controller 508 also obtains application statistics from the application profiler 518, as represented by arrows 520 and 522. At the end of this process, the placement controller 508 gathers the following information: the list of locally active applications $(a_1 \ldots a_m)$, the number of CPU cycles delivered to each application $(\omega_{a1}^{delivered} \ldots \omega_{am}^{delivered})$, the memory requirements of each application $(\gamma_{a1} \ldots \gamma_{am})$, the local experienced demand for each active application $(\omega_{a1}^{requested} \ldots \Omega_{am}^{requested})$, as well as the local experienced demand for the applications that are not offered anywhere in the network, with no active entries in the global placement matrix. The placement controller 508 sends this information back to the placement. controller 506, as represented by arrow 524. This completes the information exchange between two logical neighbors.

In addition to retrieving information from its neighbors, the placement controller 506 will also collect local information, from the local placement executor 526 and the local application profiler 528.

The Reconfiguration Phase

Figure 6:
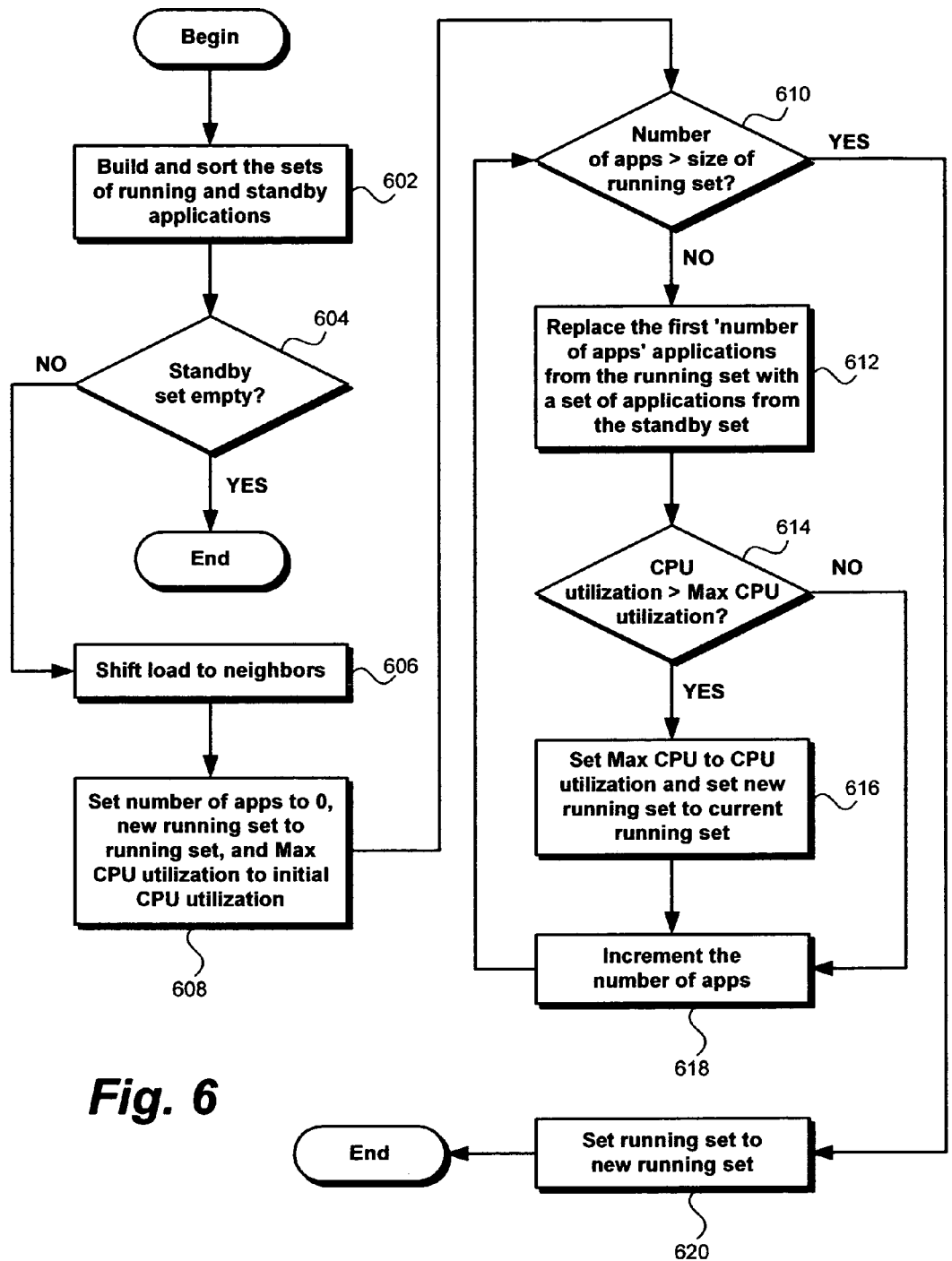
FIG. 6 is a flow diagram illustrating the logic of the reconfiguration phase of the decentralized placement algorithm according to one embodiment of the present invention.

In FIG. 6, a flowchart of a reconfiguration phase performed by one embodiment of the present invention is illustrated. As discussed in detail below, the operations of the flowchart allow for decentralized, on-demand application resource allocation under one or more load-dependent resource constraints and one or more load-independent resource constraints by dynamically reconfiguring placement of applications on nodes in a distributed manner, so as to optimize a multiplicity of metrics. It should be remarked that the logical operations shown may be implemented in hardware or software, or a combination of both. The implementation is a matter of choice dependent on the performance requirements of the system implementing the invention. Accordingly, the logical operations making up the embodiments of the present invention described herein are referred to alternatively as operations, steps, or modules.

At building operation 602, the placement controller takes as input the state of the neighborhood gathered in the previous phase, and builds a set of running applications $R=\{r_1 \ldots r_r\}$ and a set of standby applications $S=\{s_1 \ldots s_s\}$. R contains the applications currently active on the local node. S contains the applications that either run in the neighborhood of the node, but not on the node itself, or applications that are not offered anywhere in the system. S is built using the neighborhood information gathered in the previous phase.

The applications in R are sorted in the increasing order of their density, equal to the load delivered to the application r, divided by the memory usage of r ($\omega_r^{delivered}/\gamma_r$). The applications in S are sorted in the decreasing order of their residual density, equal to the unsatisfied demand for the application s divided by the memory usage of s:

$$(\Sigma_{n \in neighbors}[\omega_{ns}^{delivered} - \omega_{ns}^{requested}])/\gamma_s.$$

The standby applications for which the unsatisfied demand is zero are removed from S, as there is no need to start additional instances for those applications. Upon completion of building operation 602, control passes to determining operation 604.

At determining operation 604, the standby set is inspected. If, the standby set is empty, then the algorithm completes. If the standby set contains one or more applications, then control passes to shifting operation 606.

At shifting operation 606, the placement controller attempts to shift to the neighbors as much load as possible from one or several running applications. Shifting load for an application A is possible when one or several neighbors (a) run an instance of the application A and (b) have idle CPU capacity. It is noted that the load shifting process carried out by shifting operation 606 is an optional step that can improve the performance of the algorithm. After shifting operation 606 is completed, control passes to initializing operation 608.

Initializing operation 608 begins a control loop wherein the placement controller computes the optimal set of applications to run on the local node in such a way that the local CPU utilization is maximal. At initialization operation 608, the number of applications is set to zero, a new running set is set to the current running set, and the maximum CPU utilization is set to the initial CPU utilization.

Next, control passes to the loop of operations 610, 612, 614, 616 and 618, where the placement controller attempts to replace a subset of R with a subset of S in such a way that the CPU utilization on the local node is maximal. The number of possible re-configuration combinations for two given sets R and S can be very large. The following heuristic reduces the size of the problem to (r+1) iterations and at most ((r+1)*s) operations, where r is the size of R, and s is the size of S.

The placement controller runs (r+1) iterations, during which it examines the effect of stopping applications from R and replacing them with applications from S. The start and stop operations mentioned in the description of the iterations are only hypothetical. The placement controller assumes that a series of start and stop operations take place, and then it is assessing the effect that these operations would have on the local state.

During the first iteration, the controller does not stop any running application. If the local node has idle CPU and memory resources ($\Omega^{available}>0$ and $\Gamma^{available}>0$), then the controller attempts to start one or more standby applications.

During the iteration k, the controller computes the memory and CPU resources that become available after stopping the running applications $\{r_1 \ldots r_{k-1}\}$. The controller then allocates the available resources to the applications in S. Initially, the node attempts to fit into the available memory $s_1$ (the first application from S). If this operation succeeds ($\gamma_{s1} \leq \Gamma^{available}$) then the controller attempts to meet the entire unsatisfied CPU demand for $s_1$. As a result, $\min((\omega_{s1}^{req} - \omega_{s1}^{del}), \Omega^{available})$ CPU cycles are allocated to $s_1$. If there is not enough memory available for $s_1$, the controller continues to the next application in S. The iteration stops when there is no residual memory or CPU left to assign ($\Omega^{available}=0$ or $\Gamma^{available}=0$), or when all the applications in S have been considered.

Starting or stopping an application consumes the CPU resources of a node for a certain amount of time. For each configuration, the change cost is subtracted from the total CPU utilization. For example, if starting an application consumes the local CPU resources for 15 seconds, and the length of the execution cycle is 15 minutes, then 1.67% of the total processing power of the node will be allocated to the reconfiguration process, and the remaining 98.33% of the CPU is available for handling requests.

For each set $R^k$ obtained at the end of iteration k, the controller computes the local CPU utilization. The set $R^k$ that maximizes the local CPU utilization is the optimal configuration, which is presented at setting operation 620.

Committing and Advertising the Configuration Changes

Figure 7:
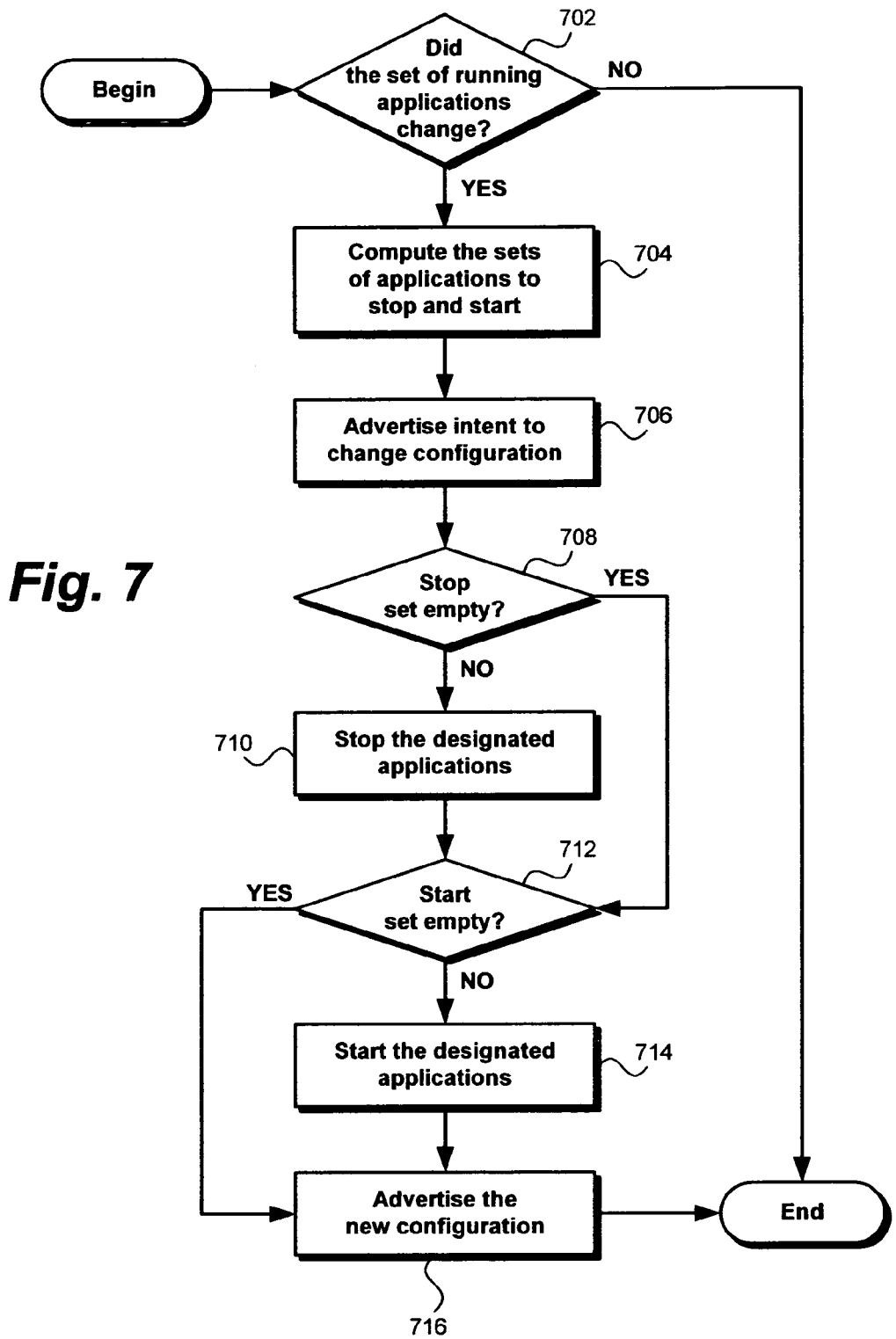
FIG. 7 is a flow diagram illustrating the logic of the committing phase of the placement algorithm according to one embodiment of the present invention.

The flow diagram in FIG. 7 illustrates the logic of the last phase of the placement algorithm. The algorithm starts at determining operation 702, where the set of running application is examined. If there is no change to the set, the process ends. If, however, the placement controller made any changes to the local configuration, control continues to computing operation 704. At computing operation 704, the sets of applications to stop and start are computed. For example, let R be the current set of active applications on the node, and let $R^k$ be the optimal configuration computed by the placement controller in the previous (reconfiguration) phase of the algorithm. Computing operation 704 computes the set of applications to stop ($R \backslash R^k$) and the set of applications to start ($R^k \backslash R$). At advertising operation 706, the node uses a dissemination mechanism to advertise the changes to all or a subset of nodes in the system.

At determining operation 708, the resulting set of applications to stop is examined. If the set of applications to stop is not empty, control passes to stopping operation 710, where the set of applications are stopped. Likewise at determining operation 712, if the set of applications to start is not empty, starting operation 714 starts the set of applications.

For the new configuration to become effective the placement controller needs to stop the applications in $R \backslash R^k$ and start the applications in $R^k \backslash R$. Starting or stopping an application consumes a significant amount of the CPU power of a node for a certain amount of time. The delay between the instant when the reconfiguration decision is taken and the instant when the change becomes effective and the node operates at its full capacity is:

$$t^{commit} = \Sigma_{a \in R \backslash R^k} t_a^{stop} + \Sigma_{a \in R^k \backslash R} t_a^{start}.$$

During the $t^{commit}$ time interval, the node cannot operate at its full capacity, as a significant amount of its CPU power is assigned to the reconfiguration process (stopping and starting applications). In order to notify the rest of the system upon the successful completion of the placement algorithm, the placement controller advertises the completion of the configuration changes to all or a subset of nodes in the system at advertising operation 716. Each advertisement message published by a placement controller can reach either all nodes in the system or just a subset of nodes in the system, depending on the use of the placement matrix. In one embodiment, a placement change is advertised to all the nodes in the system. The advertisement delay $t^{notify}$ represents the time needed for an advertisement to reach other nodes in the system. There are several ways (e.g. broadcasting) to disseminate the placement changes that took place on a node. In the next section, one implementation in the context of the present invention is discussed.

Updating and Maintaining the Global Placement Matrix

Figure 8:
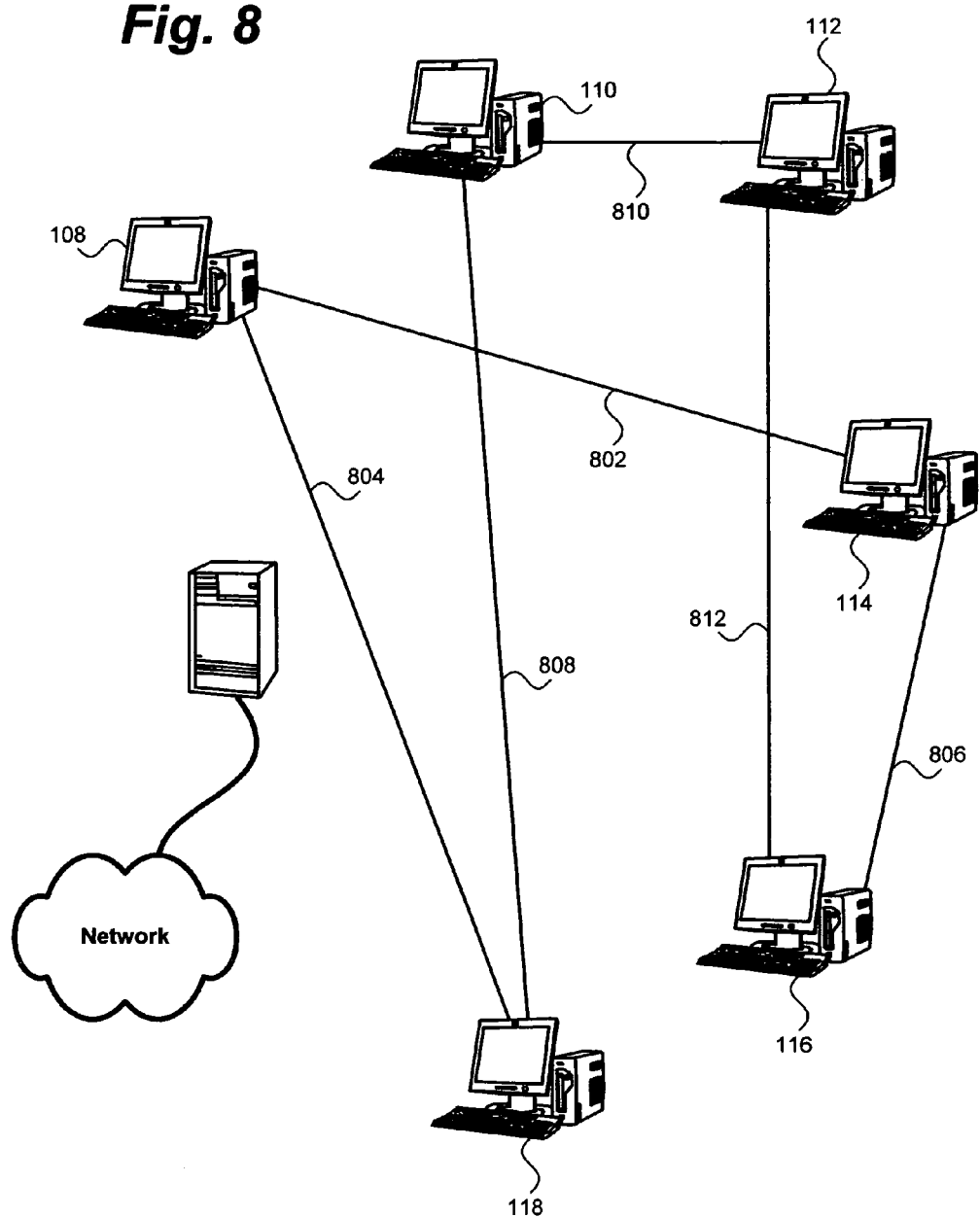
FIG. 8 is a flow diagram illustrating the way in which placement updates propagate in the system according to one embodiment of the present invention.

In a particular implementation of the present invention, nodes use a gossip protocol to disseminate placement changes and maintain updated information in their local replicas of the global placement matrix. The flow diagram in FIG. 8 illustrates an exemplary procedure for propagating changes to the placement matrix. Each node aggregates all the messages received from its neighbors during a predetermined aggregation interval of time (e.g., one second) and re-sends a subset of the aggregated messages to each of its neighbors. Assume, for example, that node 108 has finished running the placement algorithm and has modified its configuration. Node 108 sends updates to its neighbors, nodes 114 and 118, represented by lines 802 and 804, notifying them of the changes.

Upon receiving these change messages, nodes 114 and 118 do not retransmit them immediately, but instead wait until the aggregation interval expires. Any other messages received or originated by nodes 114 or 118 before the end of the aggregation interval will be aggregated with the updates received from node 108. When their respective aggregation intervals end, nodes 114 and 118 send the aggregated message, including the update received from node 108 to nodes 116 and 110, respectively (lines 806 and 808). Nodes 114 and 118 will not re-send to node 108 the updates received from node 108, but they will send to node 108 messages gathered during the aggregation interval from other sources. Similarly, nodes 110 and 116 send the update originated by 108 to the node 112, as represented by lines 810 and 812. This procedure is highly scalable, as introducing an aggregation interval limits the number of messages that each node originates during the aggregation interval.

The gossip procedure described in the previous paragraph ensures, with a high probability, that all the nodes will receive every advertised change. There is, however, a non-zero probability that some node will never receive a specific message. Consequently, errors can accumulate over time, leading to inconsistency between the local replicas of the global placement matrix. In order to prevent this from happening, each node periodically sends its complete list of active applications using the same gossip protocol described above. Nodes that receive this message use it to update their local copy of the placement matrix accordingly. Each entry in the placement matrix is associated with a timer. An entry times out and is deleted from the placement matrix if it has not been updated over a pre-determined time threshold.

Further Improving the Stability of the System

The techniques described below serialize the changes that occur in the system. They help ensure that no concurrent changes that are based on the same information occur during the placement procedure. This optional process stabilizes the system, in the sense that the system components observe and evaluate the impact of a placement decision before making another decision that affects the same resource or application. There are two types of lock requests: (a) locks for applications that already run in the system, (b) locks for applications that do not run anywhere in the system.

Figure 9:
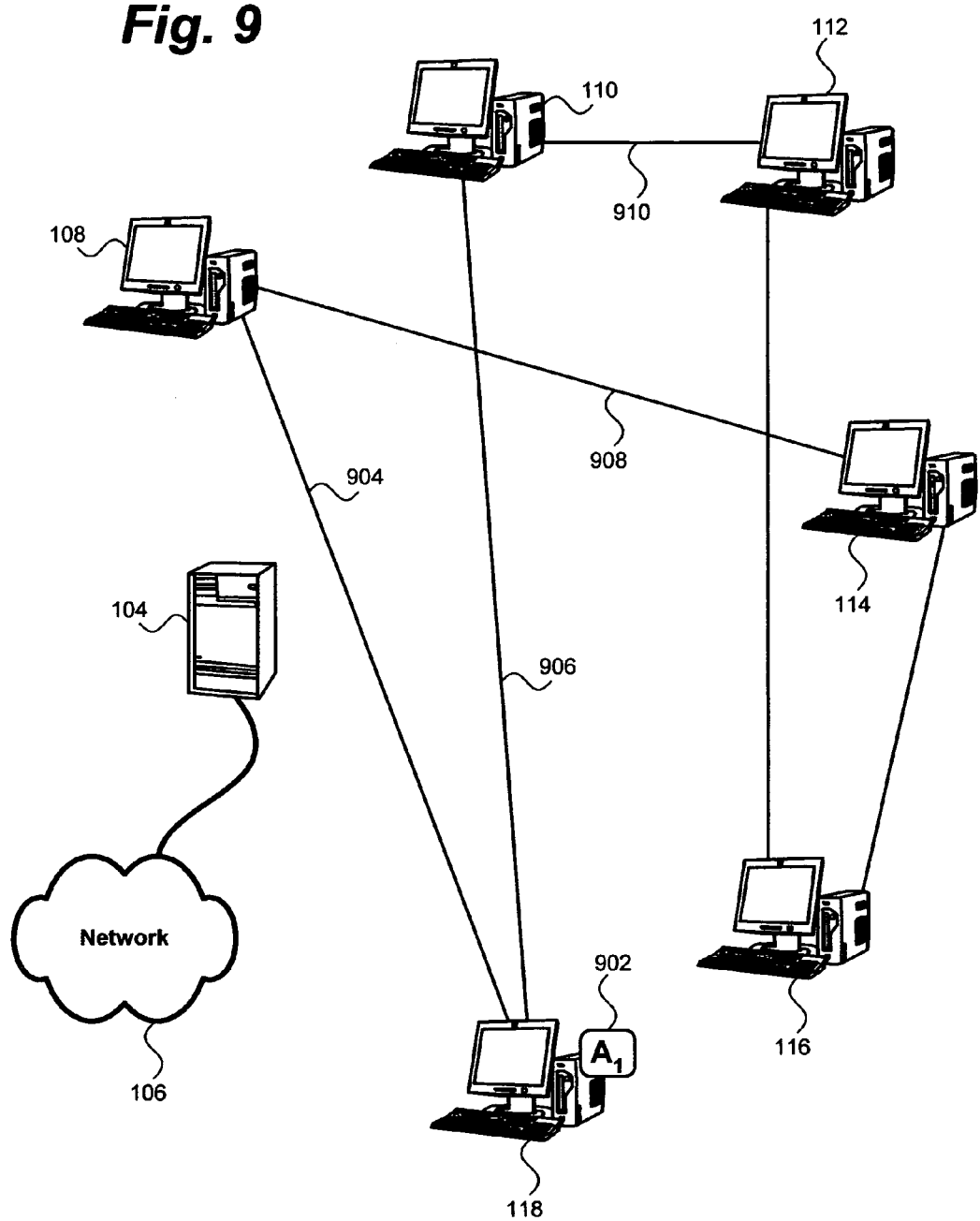
FIG. 9 is a flow diagram illustrating the way in which placement updates are serialized to maintain the stability of the system when reconfiguring existing applications according to one embodiment of the present invention.

An exemplary diagram flow in FIG. 9 shows the way in which a node acquires a lock for an application that is already running in the system. Assume that node 118 has run the placement algorithm and decided to stop (or start) application $A_1$ 902. Assume also that no other node has set a lock for this application. Node 118 requires a lock for $A_1$ from its neighbor nodes 108 and 110, as illustrated in lines 904 and 906. If nodes 108 and 110 do not already have a lock on the application $A_1$ they forward the request for locks to their neighbors, the nodes 114 and 112, as represented by lines 908 and 910 respectively. If nodes 112 and 114 do not already have a lock on the application $A_1$, they set the lock and reply to the requests from the nodes 108 and 110, respectively (lines 908 and 910). Upon receiving a positive reply, nodes 108 and 110 set their lock, and reply to node 118 (lines 904 and 906). Upon receiving positive replies from nodes 108 and 110, node 118 acquires the lock and proceeds with the placement change.

The request for a lock propagates exactly two logical hops away from the source of the request. A lock must be acquired for each application that should be stopped or started by the placement algorithm. If at any point a request for a lock fails, then the lock reservation rolls back, and the node that requested the lock waits and re-runs the placement algorithm. If the request for a lock succeeds, then the node proceeds with the placement changes, and unlocks its neighbors once the procedure is complete. In order to handle possible failures of the node after acquiring the lock, the locks have a timeout after which they expire.

Figure 10:
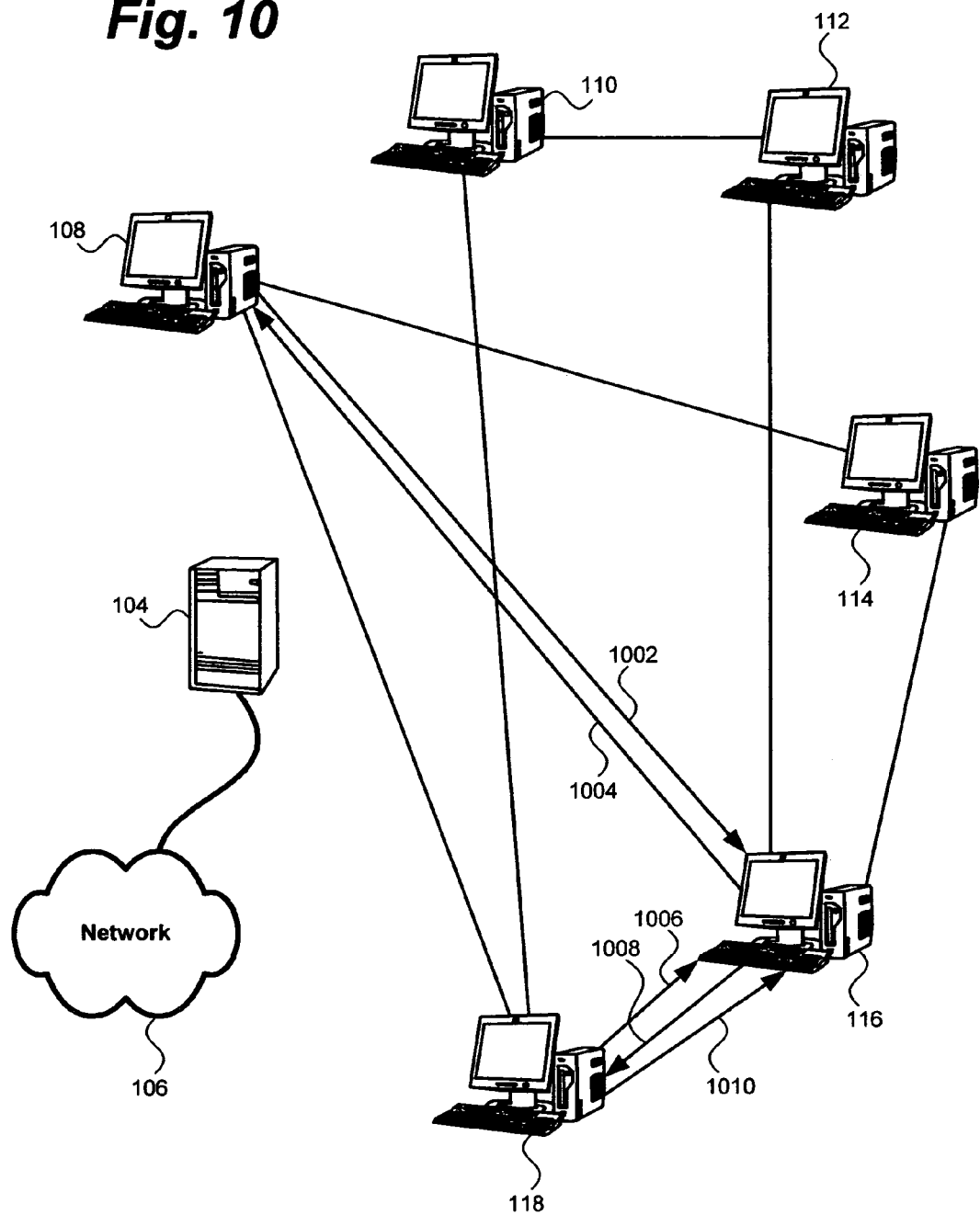
FIG. 10 is a flow diagram illustrating the way in which placement updates are serialized to maintain the stability of the system when activating new applications according to one embodiment of the present invention.

FIG. 10 is a flow diagram that illustrates the process of acquiring a lock for activating an application that is not running anywhere in the system. Assume that application $A_1$ is not running on any node in the system, and the lock holder for $A_1$ is node 116, as determined using a hash function. Node 116 receives updates from every other node about the demand for application $A_1$. For example, upon running the placement algorithm, node 108 experiences demand for application $A_1$. Node 108 sends the demand to node 116, as represented by arrow 1002. Node 116 replies with the total demand (computed over the last placement cycle) for application $A_1$, as represented by arrow 1004. Node 108 assigns the demand received from node 116 to application $A_1$ when building its set of standby applications. Assume that node 118 follows the same procedure and decides, following the placement algorithm, to start application $A_1$. Node 118 requests a lock for application $A_1$ from node 116, as represented by arrow 1006. Node 116 checks the availability of the lock, and, if available, sends the lock to node 118, represented by arrow 1008. Upon receiving the lock, node 118 uses the gossip protocol described above to inform the other nodes that it is starting application $A_1$. After starting application $A_1$, node 118 releases the lock from node 116, represented by arrow 1010.

Figure 11:
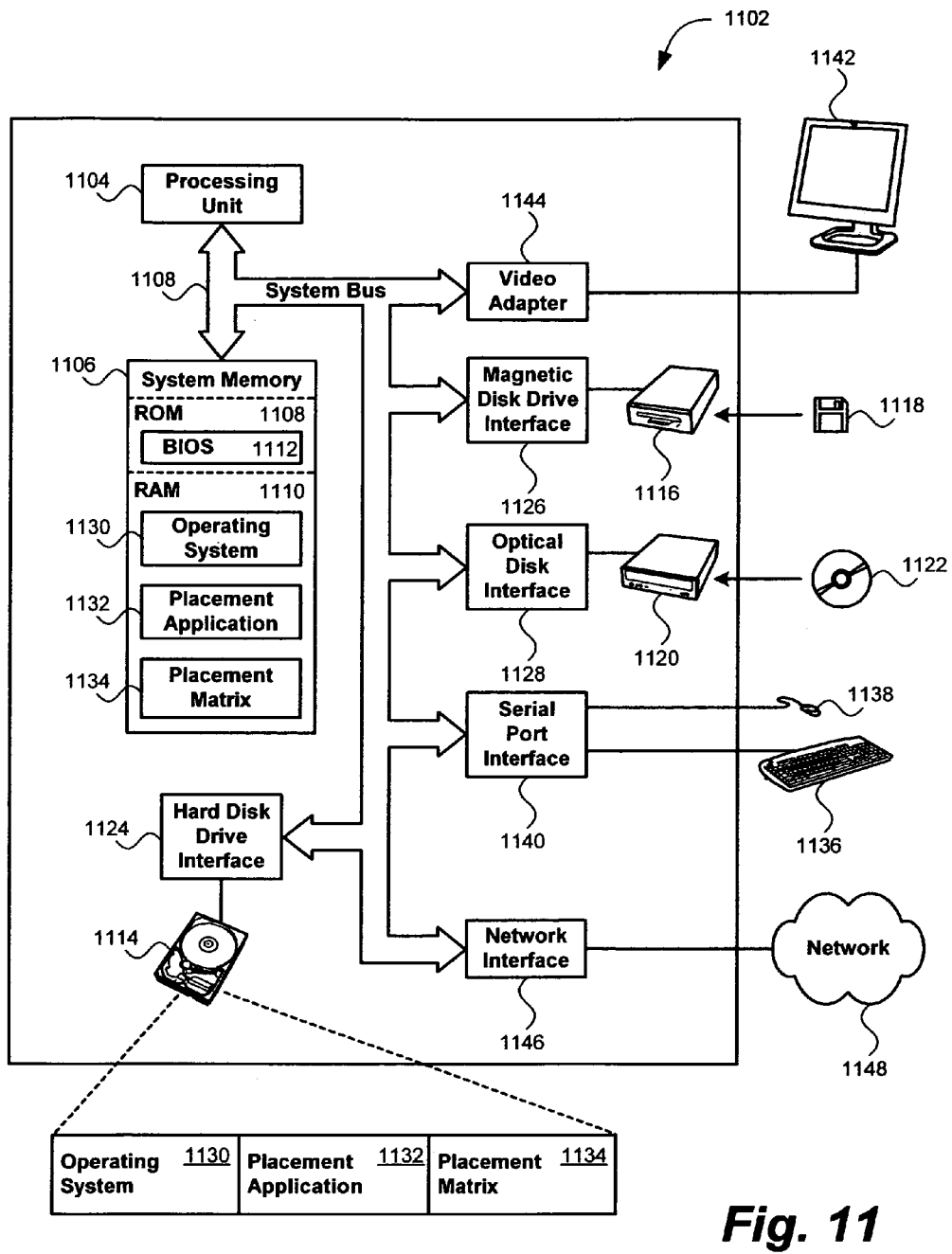
FIG. 11 shows an illustrative embodiment of a network node embodying the present invention.

With reference to FIG. 11, an illustrative embodiment of the network node 1102 in accordance with the present invention is shown. One network node 1102 in which the present invention is potentially useful encompasses the general-purpose computer. Examples of such computers include SPARC (r) systems offered by Sun Microsystems, Inc. and Pentium(r) based computers available from International Business Machines Corp. and various other computer manufacturers. SPARC is a registered trademark of Sun Microsystems, Inc. and Pentium is a registered trademark of Intel Corporation.

The network node 1102 includes a processing unit 1104, a system memory 1106, and a system bus 1108 that couples the system memory 1106 to the processing unit 1104. The system memory 1106 includes read only memory (ROM) 1108 and random access memory (RAM) 1110. A basic input/output system (BIOS) 1112, containing the basic routines that help to transfer information between elements within the network node 1102, such as during start-up, is stored in ROM 1108.

The network node 1102 further includes a hard disk drive 1114, a magnetic disk drive 1116 (to read from and write to a removable magnetic disk 1118), and an optical disk drive 1120 (for reading a CD-ROM disk 1122 or to read from and write to other optical media). The hard disk drive 1114, magnetic disk drive 1116, and optical disk drive 1120 are connected to the system bus 1108 by a hard disk interface 1124, a magnetic disk interface 1126, and an optical disk interface 1128, respectively. The drives and their associated computer-readable media provide nonvolatile storage for the computer 104. Although computer-readable media refers to a hard disk, removable magnetic media and removable optical media, it should be appreciated by those skilled in the art that other types of media that are readable by a computer, such as flash memory cards, may also be used in the illustrative node 1102.

A number of program modules may be stored in the drives and RAM 1110, including an operating system 1130, a decentralized placement application 1132, a global placement matrix 1134, and other program modules and data (not shown). As discussed above, the node 1102 is configured to dynamically reconfigure placement of applications in a distributed manner.

A user may enter commands and information into the node 1102 through a keyboard 1136 and pointing device, such as a mouse 1138. Other input devices (not shown) may include a microphone, modem, joystick, game pad, satellite dish, scanner, or the like. These and other input devices are often connected to the processing unit through a serial port interface 1140 that is coupled to the system bus 1108.

A monitor 1142 or other type of display device is also connected to the system bus 1108 via an interface, such as a video adapter 1144. In addition to the monitor, the node 1102 may include other peripheral output devices (not shown), such as speakers and printers.

The node 1102 operates in a networked environment using logical connections to one or more remote devices. The remote device may be a server, a router, a peer device or other common network node. When used in a networking environment, the node 1102 is typically connected to the network 1148 through a network interface 1146. In a network environment, program modules depicted relative to the node 1102, or portions thereof, may be stored in one or more remote memory storage devices.

Figure 12:
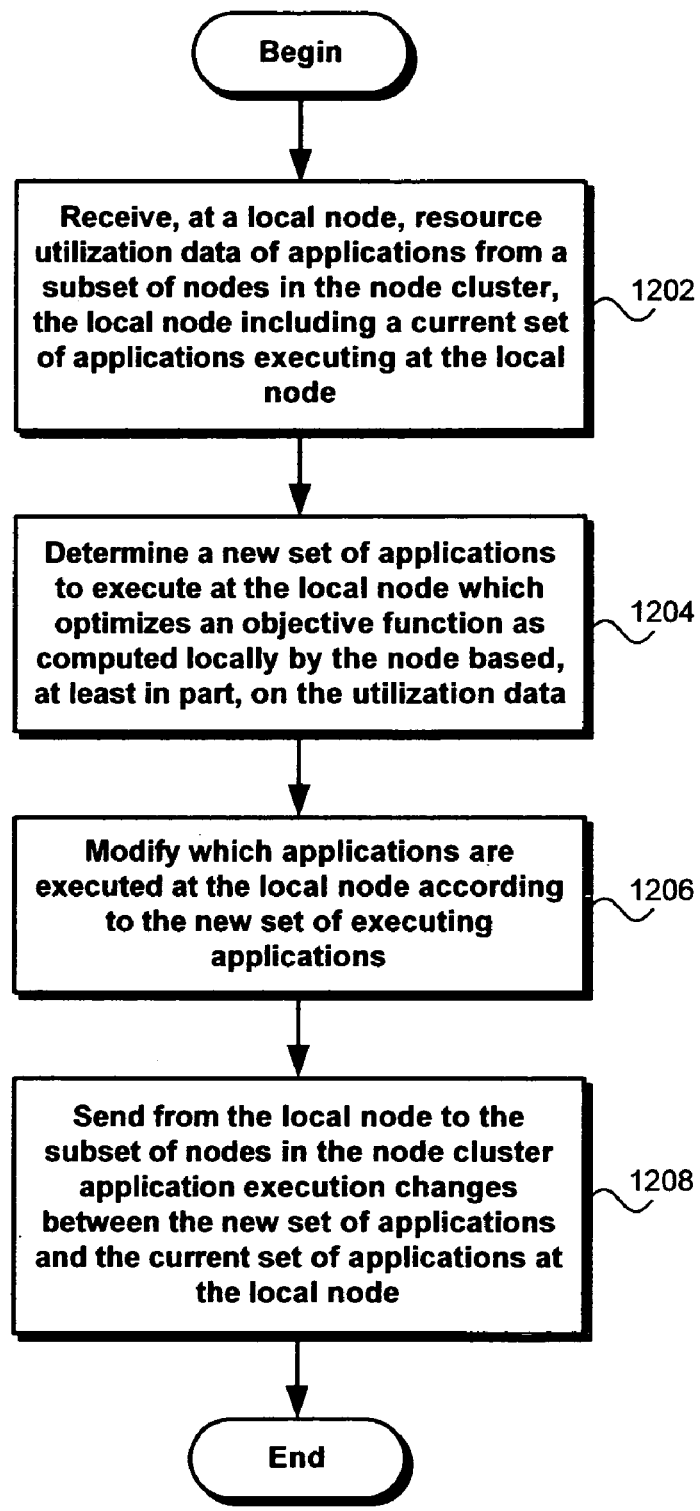
FIG. 12 shows an exemplary flowchart for decentralized application resource allocation for a cluster of nodes, as contemplated by the present invention.

Turning to FIG. 12, an exemplary flowchart for decentralized application resource allocation for a cluster of nodes, as contemplated by one embodiment of the present invention is shown. A receiving operation 1202 is configured to receive, at a local node, resource utilization data of applications from a subset of nodes in the node. cluster. In a particular embodiment of the invention, every node retrieves from each of its neighbors the following information:

(a) the list of active (executing) applications,
(b) the demand and supply for each of these active applications, and
(c) the demand for applications that are not offered anywhere in the system, that its neighbors could not route using the global placement matrix.

Based on this information, the node builds locally two sets of applications: running applications and standby applications.

The local node includes a current set of applications it is executing. With the running applications set and standby applications set, a determining operation 1204 is utilized to form a new set of applications to execute at the local node (details of this operation are discussed above). The new set of applications are configured to optimize an objective function as computed locally by the local node and are based, at least in part, on the utilization data. In one embodiment of the invention, the objective function may be a function maximizing the CPU utilization of the local node. It is contemplated, however, that other objective functions may be utilized by the present invention. For example, the objective function may be to minimize power consumption or any other function related to CPU demand.

A modifying operation 1206 modifies which applications are executed at the local node according to the new set of executing applications. A sending operation 1208 advertises from the local node to the subset of nodes in the node cluster application execution changes between the new set of applications and the current set of applications at the local node.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for decentralized application resource allocation for a cluster of nodes, the method comprising:

utilizing an overlay construction algorithm to identify a subset of nodes in the node cluster for a local node, the local node including a current set of applications executing at the local node, the subset of nodes being logical neighbors of the local node;

receiving, at the local node, resource utilization data of applications from the subset of nodes in the node cluster, wherein receiving resource utilization data includes receiving a list of active applications from each node in the subset of nodes, receiving a resource supply and demand for each active application in the list, and receiving resource utilization data for each active application in the list;

determining a new set of applications to execute at the local node which optimizes an objective function as computed locally by the local node based, at least in part, on the utilization data, wherein determining the new set of applications to execute at the local node further comprises defining a set of running applications executing on the local node, sorting the running applications in increasing order of delivered density, wherein delivered density is defined as a ratio between an amount of CPU delivered to the application and a memory utilized by the application, defining a set of standby applications, the standby applications including applications executing on the subset of nodes and not on the local node and applications not executing anywhere in the cluster of nodes, filtering the set of standby applications by removing from the set of standby applications the applications for which there is no unsatisfied demand, the unsatisfied demand being defined as the difference between demand and supply for resources, sorting the set of standby applications in decreasing order of unsatisfied density, the unsatisfied density defined as a ratio between the unsatisfied demand and the memory utilized by the application, shifting load by attempting to assign as much load as possible from the local node to the subset of nodes, building a plurality of local configurations by successively replacing applications from the sorted set of running applications with applications from the sorted set of standby applications, and selecting from the local configurations an optimal configuration that maximizes CPU utilization on the local node;

modifying which applications are executed at the local node according to the new set of executing applications;

sending from the local node to the subset of nodes in the node cluster application execution changes between the new set of applications and the current set of applications at the local node, wherein sending from the local node to the subset of nodes in the node cluster application execution changes includes using a gossip protocol, in which each node aggregates messages the node has received or originated during a predetermined interval of time, before sending the aggregated messages, inside a single message, to neighboring nodes;

locking, for each application that the local node starts and stops, all nodes located two logical hops away and preventing the nodes from starting and stopping the application; and acquiring, from a designated node, a lock that prevents other nodes from starting an application that currently is not running anywhere in the cluster of nodes, wherein the receiving, determining, modifying and sending operations are performed independently and asynchronously at each node in the cluster of nodes.

* * * * *